United States Patent Office 2,794,749
Patented June 4, 1957

2,794,749

FURNACE CARBON BLACK SLURRIES AND PROCESS FOR MAKING SAME

Walter A. Schulze, Bartlesville, Okla., assignor to Phillips Petroleum Company, a corporation of Delaware No Drawing. Application June 9, 1950,
Serial No. 167,247

9 Claims. (Cl. 106—307)

This invention relates to furnace carbon black. In one of its more specific aspects, this invention relates to aqueous furnace carbon black slurries and processes for producing such slurries. In still another specific aspect, this invention relates to aqueous furnace carbon black slurries which are used to incorporate furnace carbon black in rubber latices.

The use of carbon black as a filler and in imparting superior wear resistance to rubber goods is well known. It is generally regarded as being an essential compounding ingredient in synthetic and natural rubber in order to obtain products of desirable physical characteristics. However, certain difficulties are involved when carbon black is added to rubber on the mill. Not only are there problems encountered in connection with handling the dry, loose or pelleted black, but it is frequently difficult to obtain good dispersions of the black, particularly in synthetic rubber on account of its resistance to break-down upon milling. Since synthetic rubber is generally produced in the form of a latex, it has been proposed to incorporate carbon black into the latex, thereby making it possible to obtain a more uniform dispersion and also improve the milling characteristics of the polymer.

The direct addition of dry carbon black to latex does not ordinarily give a good dispersion of the black. There is also a tendency for the rubber in the latex to coagulate when this method is employed. It would appear feasible to prepare an aqueous slurry of the black and add it to latex. Aqueous dispersions of channel black of concentrations around 20 percent and higher are readily prepared in the presence of a dispersing agent. A single dispersing agent is usually considered sufficient for the production of a slurry of channel black of fairly high concentration, such as mentioned above. When attempts are made to prepare dispersions of furnace carbon black using the same dispersing agents that have been found applicable for channel black, the resulting slurries are not sufficiently fluid for easy handling in the plants, particularly when they contain more than 10 to 15 percent black. In fact, usually these slurries are too viscous for satisfactory operation. As is the custom with channel black slurries, it is also frequently considered desirable to produce furnace black dispersions of greater stability by passing them through a colloid mill. However, when working with furnace carbon black, this procedure frequently leads to difficulties since the viscosity of the slurry increases to such an extent that the resulting mixture often plugs the mill. A slurry with a viscosity in excess of 1000 centipoises, as measured with a Brookfield viscometer, is usually regarded as too viscous for easy handling. Furnace carbon black slurries prepared by the above described method generally have viscosities in excess of 2000 and frequently in excess of 3000 centipoises.

I have now discovered a method whereby aqueous furnace black slurries of low viscosity, preferably containing from 15 to 25 weight percent black, can be readily prepared. The method comprises dispersing the furnace carbon black in aqueous medium with the aid of a dispersing composition comprising a tannic acid product, a lignin material selected from the group consisting of lignin and sulfonated derivatives thereof, and an alkaline material selected from the group consisting of alkali metal and ammonium hydroxides. If desired, a detergent selected from the group consisting of fatty acid soaps, rosin soaps, sulfate ester soaps, and sulfonic acid soaps can also be employed in the dispersing compositions. In cases where a material of this type is used, a smaller amount of alkali metal or ammonium hydroxide is generally required and a slurry of lower viscosity is more readily obtained. The furnace carbon black slurries prepared according to the method of this invention have viscosities of 1000 centipoises or lower and preferably 600 centipoises or lower, as measured with a Brookfield viscometer. As hereinbefore set forth, when 15 to 25 percent furnace black slurries are prepared in aqueous emulsion using a single dispersing agent such as is conventional when preparing channel black slurries, viscosities in excess of 2000 centipoises are obtained.

It is an object of this invention to provide new furnace carbon black slurries and methods for producing such slurries.

It is another object of this invention to provide new and superior aqueous furnace carbon black slurries and methods for producing such slurries.

Still another object of this invention is to provide new aqueous furnace carbon black slurries to employ in adding said furnace carbon black to rubber which is in the form of rubber latices.

Other objects and advantages of this invention will become apparent to one skilled in the art upon reading this disclosure.

The process of my invention is particularly valuable in producing aqueous slurries of furnace carbon blacks which are distinguised from the older type channel, lamp, acetylene and the so-called "thermotomic" carbon blacks. The carbon blacks with which this invention is particularly concerned are those furnace carbon blacks which have relatively recently been developed and which are characterized by having a high pH, usually in the range of from 8.6 to 11. Typical examples of these high pH furnace carbon blacks are, high abrasion furnace carbon blacks (HAF blacks), high modulus furnace carbon blacks (HMF blacks), reinforcing furnace carbon blacks (RF blacks), very fine furnace carbon blacks (VFF blacks), and the like. My invention is applicable and can be applied to these furnace carbon blacks in the form of loose and/or pelleted carbon black. These furnace carbon blacks are difficult to incorporate into a slurry and give the problems which the process of my invention overcomes.

Tannins and/or tannin-containing materials are employed in the dispersing compositions of this invention. Also, gallic acid synthetically produced or extracted from nutgalls, mangoes, and other vegetable matter wherein it is present can be used in place of the tannins and/or tannin-containing materials. Gallic acid extracted from vegetable matter is usually in combination with other organic and inorganic material. The crude extracted material containing gallic acid is suitable to use in practicing my invention. The tannins which can be used in practicing my invention are: the hydrolyzable ester-type tannins, such as the gallotannins, such as m-digallic acid, gallotanic acid, diprotocatechuic, acid, di-B-resorcylic acid, etc., the galloylsugars, such as trigalloyl glycerol, trigalloyl acetoneglucose, hexalloyl mannite, tetragalloyl erythrite, etc., and the diphenylmethylolids, such as ellagic acid, cyanomaclurin, etc.; and the condensed keto-type tannins, such as hydroxybenzophenone, and the catechoetannins, such as maclurin, galitannic acid, guercin, cocatannic acid, maletto tannia, hemlock tannin, horse-chestnut tannin, epicatechol, sequoia tannin, etc. I find that the liquid extracts from the tannin-containing natural-occurring plants which contain tannins can be used in the practice of my invention, that is either the tannin-containing extract or the solid material resulting from removing the extracting liquid, which is usually water and/or an alcohol. The solids resulting from removing the extracting liquid can be redissolved in water and/or alcohol and used or it can be added as the solid material. Common natural sources of tannins are quebracho bark and wood, oak bark, gall nuts, hemlock bark, sumac, tea leaves, nuts in general, woods in general, etc. These natural occurring materials can be extracted, usually with water and/or an alcohol, and the extract contains tannins. The extracts or materials resulting from removing the extracting liquid are capable of those reactions that are recognized as or are considered due to tannins. One of the tannin-containing materials which I prefer to use is the liquid extract resulting from extracting quebracho bark and/or wood, or the powder resulting from separating the extracting liquid and the solid material. Quebracho is the common name given to either the liquid extract from extracting quebracho wood and/or bark, various concentrations of the liquid extract or the powder resulting from evaporating the liquid from the extract, and in this disclosure, with regard to the quantities of quebracho used, the term quebracho means the powder obtained from the liquid extract. I prefer to use from 0.25 to 2, more preferably 0.5 to 1.5, parts by weight per 100 parts by weight of the furnace carbon black of a tannin, a tannin-containing material recovered from an extract, gallic acid, a gallic acid-containing material recovered from an extract, or mixtures theerof. These preferable parts by weight are based on the solid material either as such or present in an extract or present in a solvent employed in adding the material to a furnace carbon black slurry.

Lignin materials which are applicable in my invention comprise lignin and sulfonated derivatives thereof. These various lignins may be used as such or, if desired, may be employed in the form of their alkali metal or ammonium salts, such as sodium lignin sulfonate, potassium lignin sulfonate, etc. The quantity of lignin compound employed will usually be within the range from 0.5 to 3 parts by weight per 100 parts by weight of furnace carbon black with 1 to 2.5 parts being preferred.

The alkaline material which is an essential ingredient of my dispersing compositions comprises alkali metal and ammonium hydroxides with the hydroxides of sodium, potassium, and ammonium being most generally preferred. The quantity employed will usually be within the range from 0.05 to 0.75 part by weight per 100 parts by weight of furnace carbon black with 0.1 to 0.5 part being the preferred range.

The remaining ingredient, which can be used if desired, in the dispersing compositions herein described comprises a detergent selected from the group consisting of fatty acid soaps, rosin soaps, sulfate ester soaps, and sulfonic acid soaps. Some typical examples of these detergents are the alkylbenzene sulfonates, alkyltolene sulfonates, potassium laurate, potassium oleate, potassium myristate, potassium stearate, and the corresponding sodium salts, and sodium and potassium salts of abietic acid and dehydro-, dihydro- and tetrahydroabietic acids, and also mixtures of the salts of these acids. The amount of this detergent employed will usually be within the range from 0.25 to 1.5 parts by weight per 100 parts by weight of furnace carbon black; preferably the amount used is in the range from 0.5 to 1.0 part.

I have found that in practicing my invention, the dispersing ingredients along with the furnace carbon black and water can be admixed and agitated in any manner which is convenient to the person preparing the slurry, that is, the important processing operations are to admix the ingredients of the slurry and to agitate the resulting mixture. I prefer to admix the lignin material, furnace carbon black and water, followed by the addition of the tannic acid product dissolved in the alkaline solution. The detergent, which is used if desired, can conveniently be added to the water prior to admixing the water with the lignin material and furnace carbon black. Slurries produced in this manner give good results and are easy to handle. However, other methods of preparing and mixing the slurries work satisfactorily. In some cases, I find it desirable to pass the mixed and agitated slurry through a colloid mill to better disperse the solids in the aqueous medium.

Example I

The following recipe was employed for preparing two 20 weight percent carbon black slurries, one with high abrasion furnace carbon black (HAF black) and the other with an easy processing channel black (EPC black):

|  | Parts by weight |
| --- | --- |
| Carbon black | 100 |
| Sodium lignin sulfonate [a] | 1.75 |
| Rosin soap, potassium salt [b] | 0.75 |
| Quebracho | 1 |
| Sodium hydroxide | 0.45 |
| Water sufficient to give a 20% slurry. | |

[a] Marasperse CB.
[b] Dresinate 214.

The rosin soap was dissolved in the water and added to a previously prepared mixture of the sodium lignin sulfonate and carbon black. This mixture was then agitated 30 minutes after which the viscosity was determined with a Brookfield viscometer. Quebracho was then added as an aqueous solution containing 10 weight percent quebracho, 4.5 weight percent sodium hydroxide and 85.5 weight percent water. The viscosity was again determined after agitation of the slurry for five minutes. The slurry was then passed through a colloid mill which was opened 0.0025 inch and the viscosity again determined. The following results were obtained:

| | Viscosity, Centipoises | | |
| --- | --- | --- | --- |
| | Before Quebracho | After Quebracho | After Milling |
| Furnace black | 3,000 | 5.3 | 10.6 |
| Channel black | 106 | 6.0 | 7.0 |

These results show that the viscosity of the channel black slurry before the addition of quebracho is relatively low and therefore would be operable for rubber masterbatching whereas the furnace black slurry is too viscous.

In order to determine whether the use of a quebracho-sodium hydroxide mixture, in the absence of any other additive, would produce a slurry of satisfactory viscosity, a mixture was prepared using 100 parts furnace black and one part quebracho dissolved in sodium hydroxide as described above. The total water used was that sufficient to give a 20 weight percent dispersion. The viscosity of the water-carbon black slurry, before the addition of the quebracho solution, was 2160 centipoises. The slurry became fluid when quebracho was added but after a few minutes agitation it became viscous. When attempts were made to pass it through a colloid mill, the mill became plugged.

*Example II*

Three furnace carbon black slurries containing 20 weight percent black were prepared using two different lignin materials and different amounts of sodium hydroxide along with quebracho in the dispersing compositions, as follows:

| Furnace Black, Parts | Lignin Material, Parts | Quebracho, Parts | NaOH Parts |
|---|---|---|---|
| 100 | Purified pine wood lignin,a 1.75 | 1.0 | 0.5 |
| 100 | Purified pine wood lignin,a 1.75 | 1.0 | 0.045 |
| 100 | Sodium lignin sulfonate,b 1.75 | 1.0 | 0.045 | a Indulin A.
b Marasperse CB.

The lignin material and black were mixed and the mixture stirred with water for 30 minutes. The quebracho was then added as a 10 weight percent solution in sodium hydroxide. The slurries were agitated and then passed through a colloid mill opened at 0.0025 inch.

The first slurry containing 0.5 part sodium hydroxide was easily milled and, after milling, gave a Brookfield viscometer reading of 800 centipoises. The last two slurries were very fluid after the quebracho was added but the colloid mill became plugged during the milling operation. In the case where the sodium lignin sulfonate was used, about one-half the slurry passed through the colloid mill but the product was too viscous for a viscosity reading.

These results show that the quantity of alkali metal hydroxide is important in the dispersing compositions in order to obtain a fluid slurry. Example I shows that a quebracho and alkali metal hydroxide mixture is not sufficient to produce the desired results.

*Example III*

Carbon black slurries containing 20 weight percent furnace carbon black and variable amounts of sodium hydroxide were prepared using the general procedure given in Example I except that in each case the quebracho solution was made by dissolving one part quebracho and 0.0442 part sodium hydroxide in sufficient water to make 10 parts of solution. The additional caustic used was added with the rosin soap solution during slurry preparation. Viscosities of the slurries were determined after passing them through a colloid mill. The following table shows the recipes used for preparing the slurries and the effect on viscosity of varying the quantity of sodium hydroxide.

|  | I | II | III | IV |
|---|---|---|---|---|
| Furnace black | 100 | 100 | 100 | 100 |
| Sodium lignin sulfonate a | 1.75 | 1.75 | 1.75 | 1.75 |
| Rosin soap, potassium salt a | 0.75 | 0.75 | 0.75 | 0.75 |
| Quebracho | 1.0 | 1.0 | 1.0 | 1.0 |
| Additional NaOH, part | 0 | 0.095 | 0.172 | 0.244 |
| Total NaOH, part | 0.0442 | 0.14 | 0.22 | 0.29 |
| Water | 396.5 | 396.5 | 396.5 | 396.5 |
| Viscosity, centipoises, after milling | 1,640 | 740 | 30 | 13 | a As in Example I.

*Example IV*

The fluid slurry from Example II, prepared using the dispersing composition comprising purified pine wood lignin, quebracho, and 0.5 part sodium hydroxide, and slurry IV from Example III, which had a viscosity of 13 centipoises after colloid milling, were masterbatched with the latex of a 53 Mooney elastomer prepared in a sugar-free recipe at 5° C. using 4.7 parts of potassium rosin soap (Dresinate 214) as the emulsifier. The polymerization recipe employed was as follows:

| | Parts by weight |
|---|---|
| Water | 180 |
| Butadiene | 72 |
| Styrene | 28 |
| Rosin soap, K salt, a | 4.7 |
| Mercaptan blend b | 0.30 |
| Diisopropylbenzene hydroperoxide | 0.077 |
| Potassium hydroxide | 0.1 |
| Potassium chloride | 0.4 |
| Potassium pyrophosphate, $K_4P_2O_7$ | 0.127 |
| Ferrous sulfate, $FeSO_4 \cdot 7H_2O$ | 0.10 | a Dresinate 214.
b A blend of tertiary $C_{12}$, $C_{14}$, and $C_{16}$ aliphatic mercaptans in a ratio of 3 : 1 : 1 parts by weight.

The following tread recipes were employed for evaluation of the polymer.

| | Parts by weight | |
|---|---|---|
| | A a | B b |
| Masterbatch | c 150 | c 150 |
| Zinc Oxide | 3 | 3 |
| Asphalt softener | 6 | 6 |
| Stearic acid | 1 | 1 |
| Flexamine (antioxidant) d | 1 | 1 |
| Sulfur | 1.75 | 1.75 |
| Santocure e | 1.00 | 1.10 | a Furnace black slurry from Example II used in preparing masterbatch.
b Furnace black slurry from Example III used in preparing masterbatch.
c Polymer plus furnace black. The black content of the masterbatch was adjusted to 33.33 weight percent to give 50 parts by weight of black per 100 parts by weight rubber in the mixed stock.
d A non-toxic, brown powder, sp. gr. 1.10, M. P. 75–90° C., consisting of a physical mixture containing 65 percent of a complex diarylamine ketone reaction product and 35 percent of N,N'-diphenyl-p-phenylenediamine.
e N-cyclohexyl-2-benzothiazolesulfenamide.

Test specimens were cured at 307° F. to 20 percent compression set. Tests were performed on the green stock and on specimens aged for 24 hours at 212° F. The various physical properties are shown below. The samples designated A and B are from the above described masterbatches.

| | A | B |
|---|---|---|
| Unaged Samples: | | |
| Minutes to 20% compression set | 37 | 36.5 |
| Stress-strain properties at 80° F.— | | |
| 300% modulus, p. s. i | 1,285 | 1,120 |
| Tensile, p. s. i | 2,935 | 3,160 |
| Elongation, percent | 570 | 660 |
| Stress-strain properties at 200° F.— | | |
| Tensile, p. s. i | 1,520 | 1,910 |
| Elongation, percent | 515 | 470 |
| Hysteresis properties— | | |
| ΔT, ° F | 85.4 | 92.9 |
| Resilience, percent | 58.4 | 57.4 |
| Flex life, thousands of flexures to failure | 29.4 | 27.1 |
| Shore hardness | 58 | 58 |
| Abrasion loss, grams (35 minute cure) | 3.90 | 3.39 |
| Compounded Mooney, MS 1½ at 212° F | 46.0 | 46.0 |
| Extrusion at 250° F.— | | |
| Inches/minute | 40.5 | 39.0 |
| Grams/minute | 100.5 | 100.5 |
| Aged Samples: | | |
| Stress-strain properties at 80° F.— | | |
| 300% modulus, p. s. i | 2,180 | 2,175 |
| Tensile, p. s. i | 2,950 | 3,350 |
| Elongation, percent | 405 | 425 |
| Hysteresis properties— | | |
| ΔT, ° F | 64.2 | 63.2 |
| Resilience, percent | 65.4 | 65.9 |
| Flex life, thousands of flexures to failure | 4.0 | 3.4 |
| Shore hardness | 65 | 65 |
| Abrasion loss, grams (35 minute cure) | 5.81 | 5.22 |

I claim:

1. Aqueous furnace carbon black slurries having viscosities of less than 1000 centipoises and containing from 15 to 25 weight percent of furnace carbon black having a pH of at least 8.6 comprising, furnace carbon black, water from 0.5 to 1.5 weight percent of said black of a material selected from the group consisting of tannins, natural-occurring tannin-containing materials, gallic acid and natural-occurring gallic acid-containing materials; from 1 to 2.5 weight percent of said black of a material selected from the group consisting of lignin, lignin sulfonates, alkali metal salts of lignin sulfonates, and ammonium lignin sulfonates; and from 0.1 to 0.5 weight percent of said black of a material selected from the group consisting of alkali metal hydroxides, and ammonium hydroxide.

2. Aqueous furnace carbon black slurries, having viscosities of less than 1000 centipoises and containing from 15 to 25 weight per cent of furnace black having a pH greater than 9 comprising, furnace carbon black, water, from 0.5 to 1.5 weight percent of said black of a material selected from the group consisting of tannins, natural-occurring tannin-containing materials, gallic acid, and natural-occurring gallic acid-containing materials; from 1 to 2.5 weight percent of said black of a material selected from group consisting of lignin, lignin sulfonates, alkali metal salts of lignin sulfonates, and ammonium lignin sulfonates; from 0.1 to 0.5 weight percent of said black of a material selected from the group consisting of alkali metal hydroxides, and ammonium hydroxide, and from 0.5 to 1.0 weight percent of said black of a material selected from the group consisting of fatty acid soaps, rosin soaps, sulfate ester soaps and sulfonic acid soaps.

3. Aqueous furnace carbon black slurries, having viscosities less than 1000 centipoises, comprising, from 15 to 25 parts by weight of a furnace carbon black having a pH of from 8.6 to 11 per 100 parts by weight of said slurry, from 0.25 to 2 parts by weight per 100 parts by weight of said furnace carbon black of a material selected from the group consisting of tannins, natural-occurring tannin-containing materials, gallic acid, and natural-occurring gallic acid-containing materials; from 0.5 to 3 parts by weight per 100 parts by weight of said furnace carbon black of a material selected from the group consisting of lignin, lignin sulfonates, alkali metal salts of lignin sulfonates, and ammonium lignin sulfonates; and from 0.05 to 0.75 part by weight per 100 parts by weight of said furnace carbon black of a material selected from the group consisting of alkali metal hydroxides, and ammonium hydroxide.

4. Aqueous furnace carbon black slurries, having viscosities less than 1000 centipoises, consisting of, from 15 to 25 parts by weight of a furnace carbon black having a pH of from 8.6 to 11 per 100 parts by weight of said slurry, from 0.25 to 2 parts by weight per 100 parts by weight of said furnace carbon black of a material selected from the group consisting of tannins, natural-occurring tannin-containing materials, gallic, acid and natural-occurring gallic acid-containing materials; from 0.5 to 3 parts by weight per 100 parts by weight of said furnace carbon black of a material selected from the group consisting of lignin, lignin sulfonates, alkali metal salts of lignin sulfonates, and ammonium lignin sulfonates; from 0.05 to 0.75 part by weight per 100 parts by weight of said furnace carbon black of a material selected from the group consisting of alkali metal hydroxides, and ammonium hydroxide, and from 0.25 to 1.5 parts by weight per 100 parts by weight of said furnace carbon black of a material selected from the group consisting of fatty acid soaps, rosin soaps, sulfate ester soaps, and sulfonic acid soaps.

5. Aqueous furnace carbon black slurries, having viscosities less than 1000 centipoises, comprising, from 15 to 25 parts by weight of a furnace carbon black having a pH of from 8.6 to 11 per 100 parts by weight of said slurry, from 0.5 to 1.5 parts by weight per 100 parts by weight of said furnace carbon black of quebracho, from 1 to 2.5 parts by weight per 100 parts by weight of said furnace carbon black of sodium lignin sulfonate, and from 0.1 to 0.5 parts by weight per 100 parts by weight of said furnace carbon black of sodium hydroxide.

6. Aqueous furnace carbon black slurries, having viscosities less than 1000 centipoises, consisting of, from 15 to 25 parts by weight of a furnace carbon black having a pH of from 8.6 to 11, per 100 parts by weight of said slurry, from 0.5 to 1.5 parts by weight per 100 parts by weight of said furnace carbon black of quebracho, from 1 to 2.5 parts by weight per 100 parts by weight of said furnace carbon black of sodium lignin sulfonate, from 0.1 to 0.5 parts by weight per 100 parts by weight of said furnace carbon black of sodium hydroxide, and from 0.5 to 1 part by weight per 100 parts by weight of said furnace carbon black of potassium salt of rosin soap.

7. Aqueous furnace carbon black slurries, having viscosities less than 600 centipoises, comprising, from 15 to 25 parts by weight of a furnace carbon black having a pH of from 8.6 to 11 per 100 parts by weight of said slurry, from 0.5 to 1.5 parts by weight per 100 parts by weight of said carbon black of quebracho, from 1 to 2.5 parts by weight per 100 parts by weight of said furnace carbon black of purified pine wood lignin, and from 0.1 to 0.5 parts by weight per 100 parts by weight of said carbon black of sodium hydroxide.

8. A process for producing aqueous furnace carbon black slurries, having viscosities less than 1,000 centipoises and containing from 15 to 25 weight percent of furnace black having a pH greater than 9, which comprises, admixing furnace carbon black, water, from 0.25 to 2 weight percent of said black of a material selected from the group consisting of tannins, natural-occurring tannin-containing materials, gallic acid, and natural-occurring gallic acid-containing materials; from 0.5 to 3 weight percent of said black of a material selected from the group consisting of lignin, lignin sulfonates, alkali metal salts of lignin sulfonates, and ammonium lignin sulfonates; and from 0.05 to 0.75 weight percent of said black of a material selected from the group consisting of alkali metal hydroxides, and ammonium hydroxide, and agitating a resulting mixture.

9. A process for producing aqueous furnace carbon black slurries, having viscosities less than 600 centipoises, containing from 15 to 25 parts by weight per 100 parts by weight of said slurry of a furnace carbon black, which comprises admixing furnace carbon black having a pH of from 8.6 to 11 with from 0.5 to 3 parts by weight per 100 parts by weight of said furnace carbon black of a material selected from the group consisting of lignin, lignin sulfonates, alkali metal salts of lignin sulfonates, and ammonium lignin sulfonates; adding water to a resulting mixture and agitating a resulting mixture, adding from 0.25 to 2 parts by weight per 100 parts by weight of said furnace carbon black of a material selected from the group consisting of tannins, natural-occurring tannin-containing materials, gallic acid, and natural-occurring gallic acid-containing materials and from 0.05 to 0.75 part by weight per 100 parts by weight of said furnace carbon black of a material selected from the group consisting of alkali metal hydroxides, and ammonium hydroxide in the form of an aqueous solution to said last named resulting mixture, agitating a resulting mixture, and mechanically colloidizing said last named resulting mixture.

References Cited in the file of this patent

UNITED STATES PATENTS

| | | |
|---|---|---|
| 844,989 | Acheson | Feb. 19, 1909 |
| 1,738,798 | Richter et al. | Dec. 10, 1929 |
| 1,920,352 | Brownlee | Aug. 1, 1933 |
| 1,969,242 | Szegvari | Aug. 7, 1934 |
| 2,046,575 | Tucker | July 7, 1936 |
| 2,046,758 | Tucker | July 7, 1936 |
| 2,419,512 | Vesce | Apr. 22, 1947 |
| 2,432,461 | Vesce | Dec. 9, 1947 |

FOREIGN PATENTS

| | | |
|---|---|---|
| 259,889 | Great Britain | Oct. 21, 1926 |
| 355,503 | Great Britain | Aug. 27, 1931 |